United States Patent
Holmes, IV et al.

(10) Patent No.: US 6,688,652 B2
(45) Date of Patent: Feb. 10, 2004

(54) LOCKING DEVICE AND METHOD FOR SECURING TELESCOPED PIPE

(75) Inventors: William W. Holmes, IV, Birmingham, AL (US); Daniel A. Copeland, Bessemer, AL (US)

(73) Assignee: U.S. Pipe and Foundry Company, Birmingham, AL (US)

( * ) Notice: Subject to any disclaimer, the term of this patent is extended or adjusted under 35 U.S.C. 154(b) by 0 days.

(21) Appl. No.: 10/017,889

(22) Filed: Dec. 12, 2001

(65) Prior Publication Data

US 2003/0107214 A1 Jun. 12, 2003

(51) Int. Cl.$^7$ .............................. F16L 21/08; F16J 15/12
(52) U.S. Cl. ........................................ 285/105; 285/337
(58) Field of Search ................................ 285/337, 104, 285/105

(56) References Cited

U.S. PATENT DOCUMENTS

| | | | |
|---|---|---|---|
| 1,930,194 A | | 10/1933 | Dillon |
| 2,473,046 A | * | 6/1949 | Adams .................. 285/383 |
| 2,491,004 A | * | 12/1949 | Graham ................. 285/105 |
| 3,582,112 A | * | 6/1971 | Pico ..................... 285/96 |
| 3,724,880 A | | 4/1973 | Seiler |
| 3,877,733 A | * | 4/1975 | Straub ................... 285/105 |
| 3,963,298 A | | 6/1976 | Seiler |
| 4,229,026 A | | 10/1980 | Seiler |
| 4,540,204 A | | 9/1985 | Battle et al. |
| 4,660,866 A | | 4/1987 | Jones et al. |
| 4,848,805 A | | 7/1989 | Bucher et al. |
| 4,867,488 A | | 9/1989 | Jones |
| 5,094,467 A | | 3/1992 | Lagabe |
| 5,197,768 A | | 3/1993 | Conner |
| 5,219,189 A | | 6/1993 | Demoisson et al. |
| 5,269,569 A | | 12/1993 | Weber et al. |
| 5,295,697 A | | 3/1994 | Weber et al. |
| 5,360,218 A | | 11/1994 | Percebois et al. |
| 5,464,228 A | | 11/1995 | Weber et al. |
| 5,603,530 A | * | 2/1997 | Guest .................... 285/105 |
| 5,645,285 A | | 7/1997 | Percebois et al. |
| 6,062,611 A | | 5/2000 | Percebois et al. |
| 6,220,635 B1 | | 4/2001 | Vitel et al. |

* cited by examiner

Primary Examiner—Eric K. Nicholson
(74) Attorney, Agent, or Firm—Bradley Arant Rose & White LLP

(57) ABSTRACT

A locking segment for use in connecting two lengths of pipe has a radically extending heel that serves as a rotational brake. By mating the brake into an annular trough, that is, by placing it between two walls, the rotation of the segment can continue only until points on the brake mure between the two walls. Rotation of the segment in response to increasing thrust pressures can thereby be arrested before the rotation causes the segment to bear on the spigot with a radically inward force great enough to penetrate the spigot.

6 Claims, 4 Drawing Sheets

US 6,688,652 B2

LOCKING DEVICE AND METHOD FOR SECURING TELESCOPED PIPE

BACKGROUND OF THE INVENTION

1. Field of the Invention

This invention relates generally to connections between lengths of pipe, or between pipes and fittings. More particularly, the invention is directed toward a device and method of connecting two lengths of pipe in a restrained joint configuration, while employing a locking segment that is self-braking to prevent over-rotation and penetration of a spigot.

2. Description of Related Art

Due to thrust forces, earth movement, and external mechanical forces exerted on pipes, the industry has focused substantial attention on the problem of maintaining connections between adjacent lengths of pipe after installation. The result of this attention is a library of differing solutions and approaches known in the art. The majority of these solutions can be categorized into either "push-on" joints or "mechanical joints."

Push-on solutions are exemplified by U.S. Pat. No. 2,953,398, and account for the majority of straight-run pipe connections. In a typical configuration, a spigot end of a pipe slides into a bell end of another pipe past a tightly fitted gasket. A variation of the push-on joint is evidenced by U.S. Pat. No. 2,201,372, to Miller, which employs a compression snap-ring fitted within a special lip of the bell, in order to exert pressure onto locking segments and thus drive them into the spigot, restraining the joint against thrust forces. U.S. Pat. No. 3,445,120, to Barr, likewise employs a gasket with stiffening segments completely encased therein that are generally disposed such that they and the gasket may roll between a locking and a free position. As the Barr gasket rolls under extraction forces, it is intended eventually to encounter a position in which the stiffened plane needs to compress for further rolling, in theory terminating the rolling and restraining the joint.

Other examples of restrained push-on joints include U.S. Pat. Nos. 5,295,697; 5,464,228; and 5,067,751. The securement of the connection in such references is effected by locking segments or wedges within the gasket that engage the spigot. The locking segments possess a groove that mates with an annular rib on the bell, such that the rib acts as a rocker, or cam, or during some movements, as a wedge. During insertion of the spigot into the bell, the segments rotate on the rib, but are prevented from appreciable straight-line movement by the mating of the rib and groove. Upon experiencing counter-forces tending to effect removal of the spigot, the rib acts as a cam, both causing the segments to pivot on the rib as an axis, and exerting a radially inward pressure as the segment attempts to slide past the rib.

BRIEF SUMMARY OF THE INVENTION

A locking segment for use in a restrained joint avoids over-rotation and penetration of the inserted spigot by muring between two surfaces in the bell, thus arresting rotation before positions are reached in which pressures on the spigot would result in likely penetration. The segment therefore can rotate to an effective locking degree, upon which rotation the radial forces by which the segment bites into the pipe increase. By virtue of the muring that prevents rotation beyond a desired maximum, a graph of the relationship between a radial force exerted by the segment on the spigot, in relation to the thrust force experienced could show a radial force that generally increases as thrust forces increase, but only up to a given point. At that point, the line representing radial force could be made to substantially plateau. By selection of materials and configurations, the plateau may be fixed below a spigot penetration value.

OBJECTS OF THE INVENTION

The following stated objects of the invention are alternative and exemplary objects only, and no one or any should be read as required for the practice of the invention, or as an exhaustive listing of objects accomplished.

As suggested by the foregoing discussion, an exemplary and non-exclusive alternative object of this invention is to provide a locking segment that is capable under certain conditions of self-braking, to prevent over-rotation or other un-capped increases in radially inward pressure as thrust forces increase.

A further exemplary and non-exclusive alternative object is to provide a joint in which a locking segment is capable of selectively converting a portion of thrust forces into radially inward pressures, up to a maximum radial pressure that is thereafter unaffected by increasing thrust forces.

A further exemplary and non-exclusive alternative object is to provide a joint that counters extraction of a spigot by distributing thrust forces into opposing axial forces in the bell, and a radial force between bell and spigot that has a maximum, which is below the magnitude of force that would fail the spigot.

A further exemplary and non-exclusive alternative object is to provide an effective restrained joint that resists over-penetration of the spigot.

The above objects and advantages are neither exhaustive nor individually or collectively critical to the spirit and practice of the invention, except as stated in the claims. Other or alternative objects and advantages of the present invention will become apparent to those skilled in the art from the following description of the invention.

DETAILED DESCRIPTION OF THE INVENTION

The following is a detailed exemplary description of an embodiment of the invention, in a number of its various aspects. Those skilled in the art will understand that the specificity provided herein is intended for illustrative purposes with respect to an exemplary embodiment, and is not to be interpreted as limiting the scope of the invention or claims. References to "pipe" in this document, when used with respect to the present invention, shall be understood equally to refer to any pipe length, appurtenance, fitting, connection, or any other connected or connectable device or element.

Figure 1:
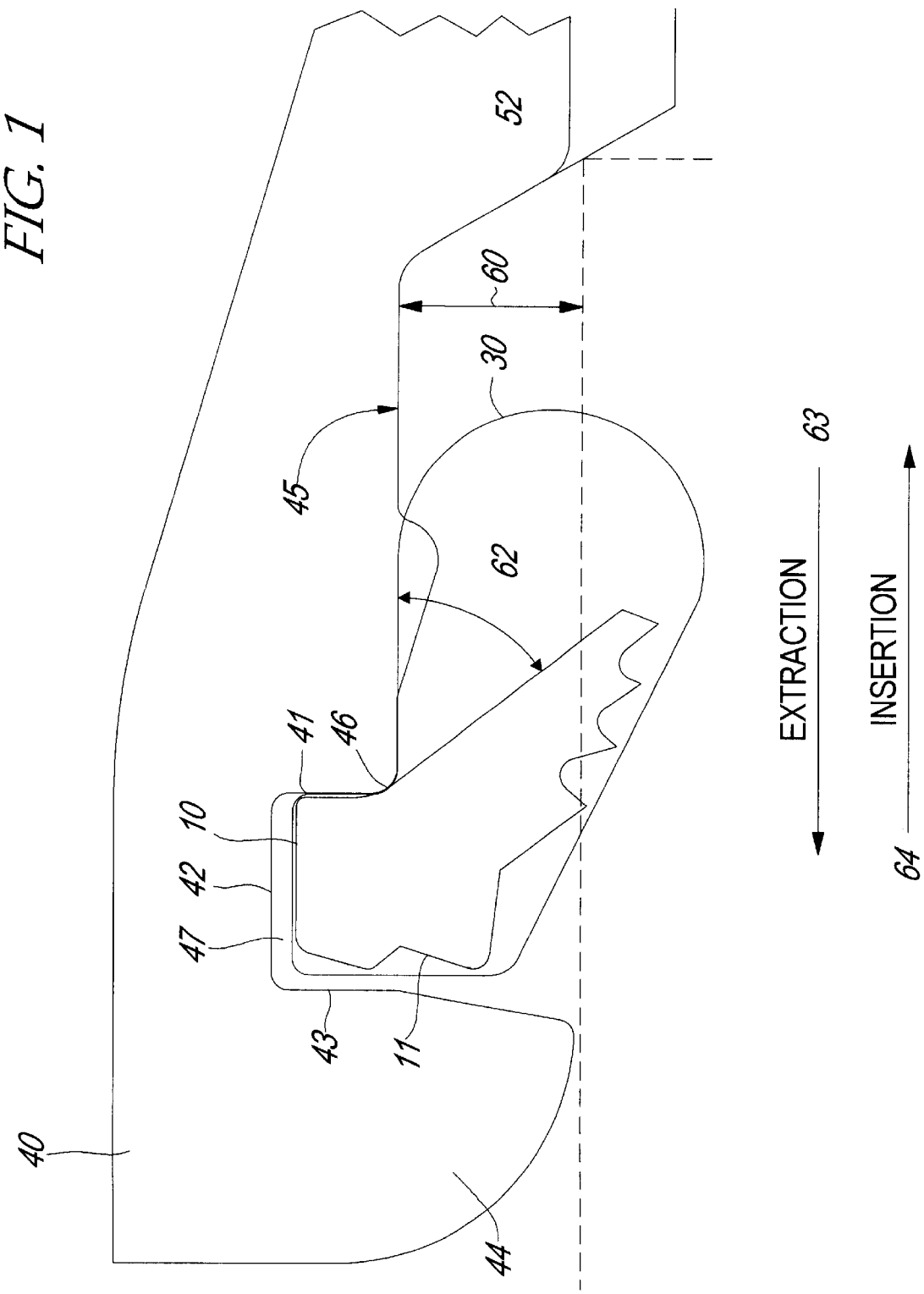
FIG. 1 shows a diagram of a cut-away of the gasket and locking segment of the present invention, in place in a bell of a pipe, and in an unstressed position (in absence of a spigot, with spigot position shown by dotted horizontal).
Figure 2:
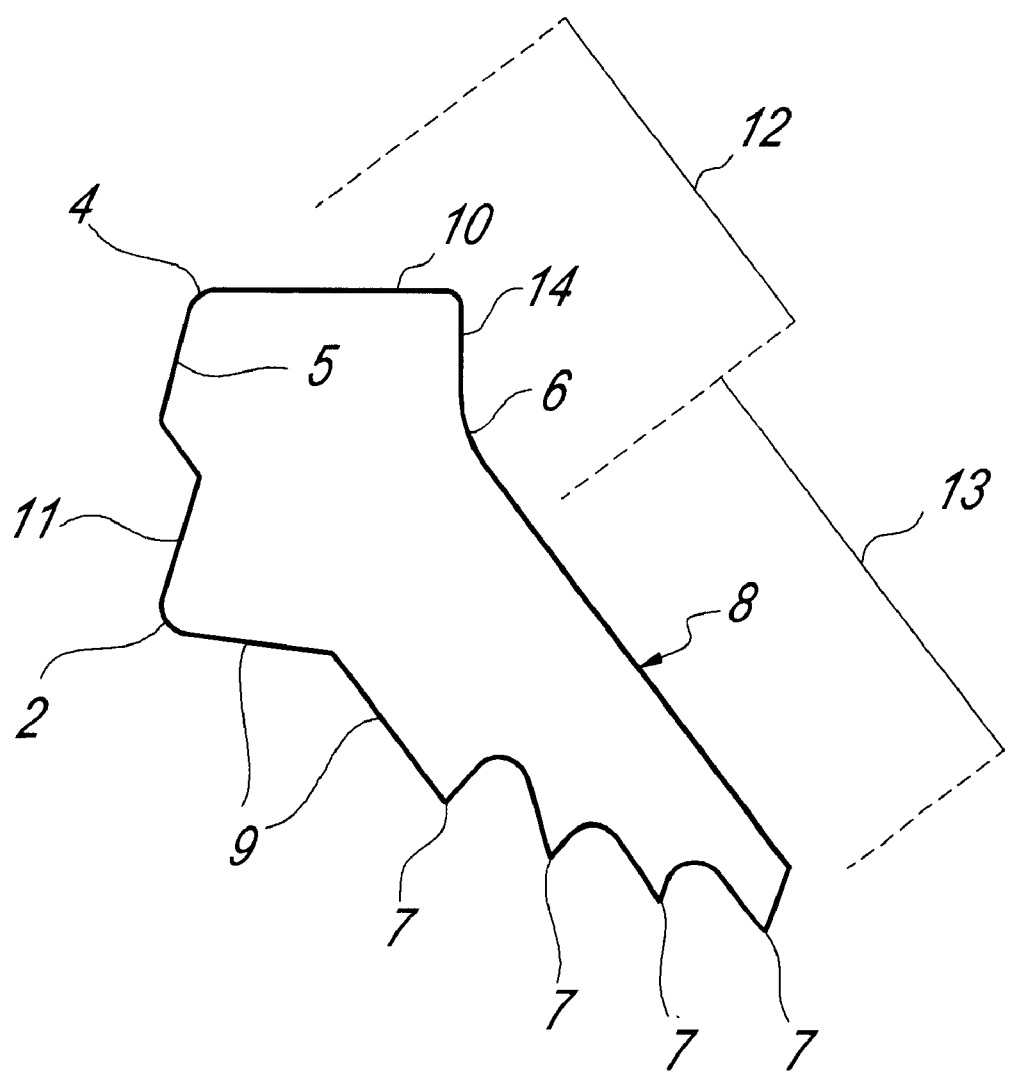
FIG. 2 depicts a close detail of an embodiment of the segment of the present invention, in profile.

As is depicted in FIGS. 1 and 2, the locking segment 1 of the present invention is optimally constructed to fit within a gasket 30 that is configured to fit within any standard push-on bell having a gasket seat configured with an annular trough 47, also known as a keeper groove, without necessitating changes to the configuration of the bell or spigot. Alternatively, the locking segment 1 of the present invention can be used with a mechanical joint having a thrust ring or gland follower, rather than a cast bell lip 44, so long as an annular trough 47 is present in the assembled joint. In the spirit of the invention, non-standard bell configurations may be constructed to fall within the claims.

Figure 4:
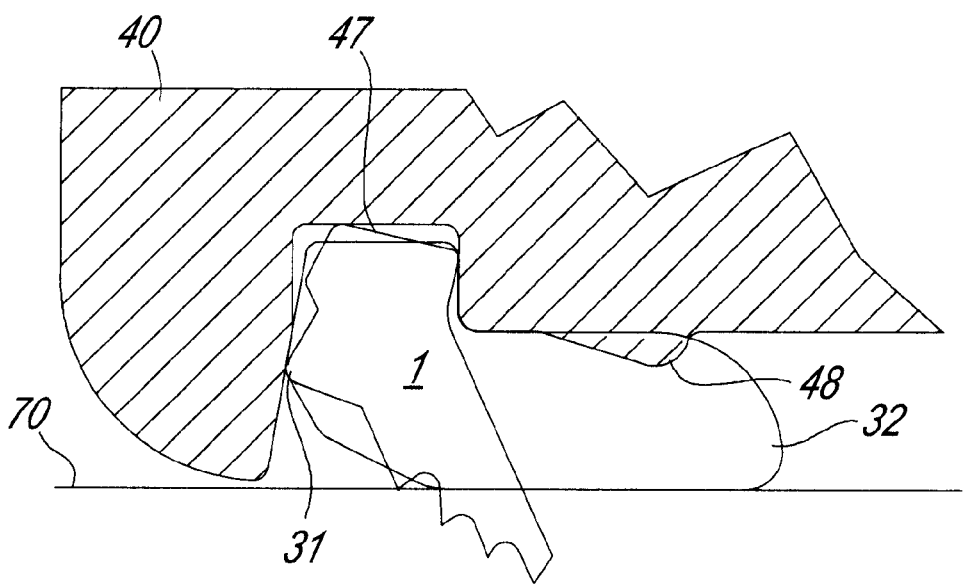
FIG. 4 is a drawing of the locked pipe joint under the present invention, following insertion and extraction thrusts, wherein the segment is fully engaged with the spigot to prevent extraction.

Looking to FIG. 1, as will be understood in the art, a typical bell configuration (standard or non-standard) will exhibit, at a minimum, a socket area of the bell 40, having an increased internal diameter as compared to the flow-area internal diameter of the bell pipe. A bell lip 44 extends in a generally radial direction, which serves as an externally visible face of the bell. Moving axially inwardly of the bell lip 44, in the direction of insertion (shown by arrow 64), the bell 40 has a cavity for receiving and mating with the spigot 70. In assembled operation, following insertion of a spigot 70, the cavity will take the form of an annular gap 60 between the spigot and the bell cavity boundary 45, which cavity boundary 45 in the shown embodiment is represented by a generally cylindrical internal wall of the bell, but which also may have ridges, ribs, gasket retainers, steps, varying radial depths, and other non-cylindrical characteristics such as gasket compression rib 48, as depicted in FIG. 4.

In addition to the cavity boundary 45, the shown internal configuration of bell 40 includes an annular trough 47, arranged and suited in the shown configuration for the purpose of positioning a sealing gasket or other materials. This annular trough 47 may be located immediately adjacent the internal side of bell lip 40, as it appears in the shown embodiment (FIG. 1), or it may divide cavity boundary 45 into two axially separated sections. This annular trough 47 is bounded at its radial extreme by a trough terminus 42, which may be cylindrical as shown in the figures, or may be of other geometry, and is bounded on axially inward and outward sides a first interior surface and a second interior surface opposing the first interior surface, shown in the figures as a first wall 43 and second wall 41, respectively. Trough first and second walls 43 and 41 are generally radially extending, though they may have a curved or slanted geometry, so long as they do not detract from the ability to brace the mured braking effect described in summary above or in greater detail below. As shown in FIG. 1, the second wall 41 is joined to cavity boundary 45 at a shoulder that serves as an insertion fulcrum 46 during assembly, but which during extraction movements of spigot 70 bears no force and presents no radially inward cam-type influence on segment 1. Notably in the shown embodiment, the segment 1 possesses no radially outwardly protruding surfaces outside of annular trough 47 that would impede substantially straight-line movement of segment 1 as a whole in the direction of the bell lip 44.

Moving still further inward of the annular trough 47 and the cavity boundary 45, the bell 40 possesses a shoulder 52 stepping the interior profile of the bell 40 to a lower radius of clearance. As will be understood in the art, this shoulder acts as a stop to further insertion of the spigot 70.

Figure 5:
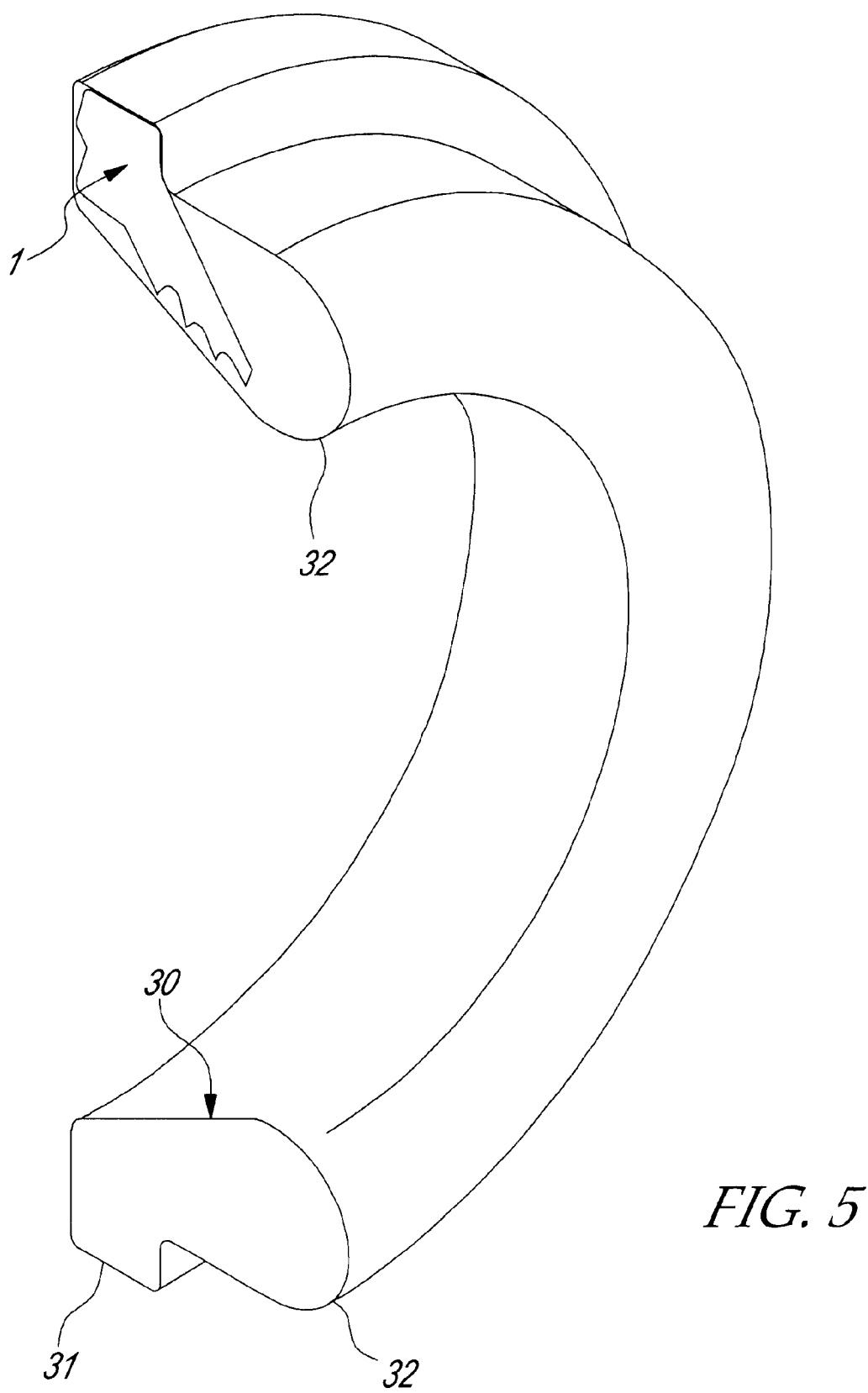
FIG. 5 is a gasket as in the present invention, shown in cut-away for viewing a cross-sectional profile at location of an embedded segment.

Looking now at FIG. 5, an embodiment of a gasket 30 for use with the present invention is shown. As will be appreciated in the art, shown gasket 30 is configured with a bulb 32 for sealing a joint against fluid leakage. To this end, the gasket may be a complete ring with its outer diameter approximating or slightly greater than the inner diameter of bell 40 at the location into which gasket 30 is to fit. This bulb may be of an elastomeric or other resilient material sized with consideration taken to its elasticity and compressibility. In operation of the joint, if the gasket 30 is intended to seal the joint, it should be sized to fit within the annular gap 60 only upon some compression between the spigot 70 and the bell 40. In particular, for any given spigot 70, gasket 30 tends to have a slightly smaller inner diameter than the outer diameter of the spigot 70. Accordingly, insertion of spigot 70 into bell 40 will require exertion of force sufficient to compress gasket 30 against cavity boundary 45. In addition to the bulb 32, gasket 30 possesses a retainer heel 31, configured to mate with annular trough 47 in such a manner that when gasket 30 is installed in bell 40, retainer heel 31 fits within annular trough 47 and positions bulb 32 such that gasket 30 is appropriately oriented. Typically, though not necessarily, retainer heel may be constructed of an elastomer of a higher durometer rating than that of bulb 32. As will be understood in the art, this is because bulb 32 should desirably be capable of flexibility and compression for sealing efficiency, while an increased firmness of retainer heel 31 may allow the retainer heel 31 to remain mated within annular trough 47 despite axial movement of spigot 70.

In addition to sealing, gasket 30 retains locking segment 1 within a range of desired orientations during assembly. It thus should be understood that the gasket 30 need not necessarily effectively perform a sealing function to fall within the scope of the invention. Although in the shown embodiment and the remainder of this description the gasket 30 is sufficient to provide a sealing function, the inventors recognize within the spirit and scope of one alternative embodiment that the shown gasket 30 may be substituted with a simple positioning body, or retainer, operating to hold the locking segments 1 in a desired range of orientations during assembly. In such alternative, the gasket 30 need not have sealing properties, nor be continuous about the perimeter. It is possible in such alternative that the retainer be a wire or snap ring urging the locking segment 1 radially outward.

Turning now to FIG. 2, an embodiment of a locking segment 1 is depicted. Reference to directions and orientation in this description of the shown locking segment 1 is made with respect to the orientation of the locking segment 1 as installed in a bell 40, seen in FIG. 1. Locking segment 1 generally may be divided for discussion purposes into a first portion, or brake 12, and a second portion, or toe 13. Brake 12 extends radially outwardly of toe 13. Toe 13 is constructed to engage spigot 70, at least upon movement of spigot 70 in an extraction direction. To facilitate this engagement, the shown toe 13 is configured as a wedge or triangular shape, and possesses on its radially inward bottom 9 as a toothed surface with at least one tooth 7, which is constructed of a material having a hardness sufficient to penetrate the surface of spigot 70. In the shown embodiment, the radially outward side of toe 13 opposite bottom 9 is top 8, is shown without teeth or any protrusion or extension that could impinge, rotate, or resistively meet cavity boundary 45. As shown top 8 joins to axially inward heel side 14 at a transition point 6. Similarly, bottom 9 joins an axially outward side of brake 12 at a braking elbow 2. Outward side 11 and inward side 14 are connected at their radial extremes by a mating surface 10. In the shown embodiment, the transition from inward side 14 to mating surface 10 serves also as forward brake 3, though it will be understood from the discussion below that the forward brake 3 need not necessarily be at the intersection of inward side 14 and mating surface 10 (e.g., it could be a protrusion or nub in the middle of inward side 14, or adapt a functionally similar alternative location). Similarly, the shown embodiment features an insertion brake 5 located as a portion of outward side 11 near outer corner 4, though the insertion brake 5 and outer corner 4 can in some embodiments be coincident, and, indeed, even in the shown embodiment the outer corner 4 may perform the insertion braking function of insertion brake 5 to some degree. In the shown embodiment, segment 1 appears with the angle between the toe and the heel between approximately 120 degrees and 170 degrees.

As can be seen readily from FIG. 1, brake 12 is held by gasket 30 (or other retainer used in place of gasket 30) at least partially within annular trough 47, and having at least a portion of toe 13 extending exteriorly of the annular trough 47, and radially inward of the same, to allow contact between a tooth 7 and the spigot 70 in some orientations of locking segment 1. While the figures show an embodiment having the toe 13 extending from the annular trough, it is conceivable within the scope of the invention that the locking segment 1, including all portions of toe 13, may in some alternative embodiments reside entirely within the annular trough 47, so long as the toe 13 is capable of making resistive contact with spigot 70, whether by alternative configurations of the bell 40 or the spigot 70. For ease of application to a wide range of spigots 70 and bells 40 as are already present in the market, the inventors have shown the particular embodiment having a toe 13 extending from annular trough 47 to meet spigot 70, rather than an embodiment that may rely on special configurations of spigot 70.

In assembly, locking segment 1 is molded into or inserted into gasket 30, with the brake 12 of locking segment 1 extending into the retainer heel 31 of gasket 30, as may be seen from the cut-away of FIG. 5. Although not shown, the brake 12 can, in addition to extending into retainer heel 31, extend beyond the retainer heel 31, such that the brake 12 is visible from outside the retainer heel 31. As shown, the tooth 7 should be sufficiently near the surface of bulb 32 to allow penetration of the bulb and direct contact with spigot 70. It will be understood in the art that some alternative embodiments may not require or encourage direct spigot 70-to-tooth 7 contact. In such cases, the operation of the invention may continue in effect, though appropriate modifications may be necessary to provide a sufficient resistance between the locking segment 1 and spigot 70, such as special ribs or notches formed onto the spigot 70. Regardless of the mode of contact between locking segment 1 and spigot 70, typically, though not absolutely necessarily, a number of locking segments 1 will be dispersed about gasket 30. In the shown embodiment, fifty-six locking segments 1 are dispersed about a thirty-six inch diameter spigot 70. The inventors' experiments suggest the invention will bring ready improvements over the art to at least thirty through sixty-four inch pipe; the invention is applicable to smaller diameters and possibly to larger diameters as well, and, though not empirically tested, is expected to provide excellent results.

Figure 3:
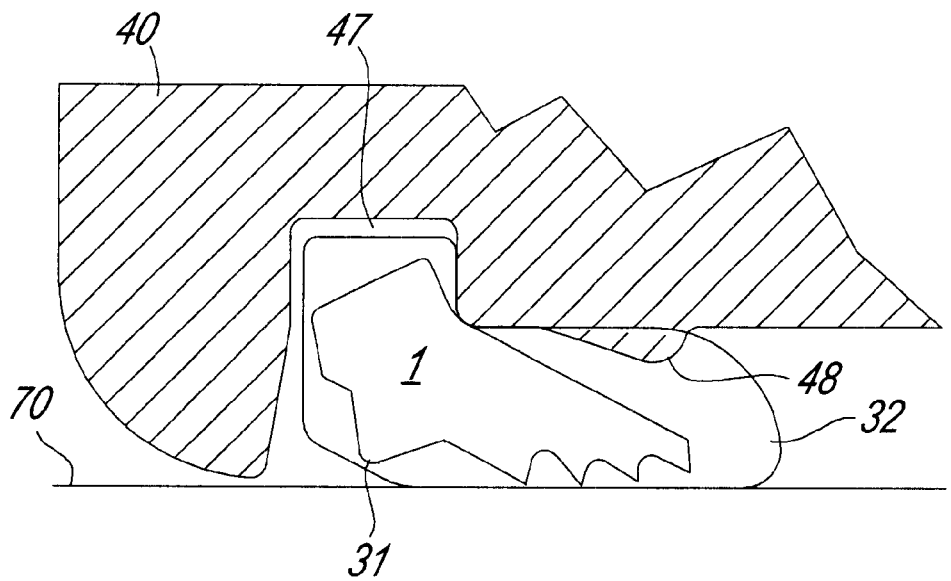
FIG. 3 demonstrates the cross-sectional view of the gasket and locking segment of the present invention in the presence of a spigot segment during the insertion movement.

Furthering the assembly, the gasket 30 is placed within bell 40, such that retainer heel 31 mates with annular trough 47. This assembly arrangement will cause brake 12 also to be at least partially within annular trough 47, and toe 13 to extend out of the annular trough 47 and into the cavity 49 (i.e., in presence of a spigot 70, the annular gap 60). In this orientation, prior to extraction movements of a spigot, segment 1 is in a resting position. The presence of the retainer heel 31 in annular trough 47 tends to secure the gasket 30 in place against axial displacement. In some embodiments, the locking segments 1 may further this securement, as well. Following insertion and seating of the gasket 30, spigot 70 is inserted into the bell 40 by movement in the direction of arrow 64. As spigot 70 passes lip 44, it will come into contact with gasket 30. Upon insertion pressures, spigot 70 will tend to push gasket 30 axially inwardly, but as a body, gasket 30 resists such movement due to the securement of retainer heel 31 in annular trough 47. Consequently, bulb 32 is compressed within the annular gap 60, as may be seen in FIG. 3. It will be understood that this compression has a number of effects. Among the effects are the sealing of the joint against fluid flow through the annular gap 60, and the relative centering of the spigot 70 within the cavity 49 due to circumferentially distributed pressures of the gasket 30.

As the gasket is compressed, it will be evident to those in the art that the locking segment 1 will rotate such that the toe 13 moves radially outwardly, but heel 12, being engaged with the annular trough 47, has a limited range of radial movement. In operation, during insertion the shown locking segment 1 rotates against insertion fulcrum 46, pivoting about this point as an axis of rotation. It will be understood by those in the art that although the insertion fulcrum 46 is shown as a right-angle shoulder, alternative embodiments of the joint described and claimed herein may form insertion fulcrum 46 as a rib raised in a radially inward direction from the cavity boundary 45, or as a depression at the intended location for locking segment 1, recessed radially outwardly from cavity boundary 45 to create a more gentle or a cammed fulcrum or other effect. The locking segment 1 is constructed and oriented in such a manner as to allow the locking segment 1 enough rotational freedom within the annular trough 47 and the annular gap 60 to accommodate entry of the spigot 70 into the cavity 49. With the particular embodiment shown, due to the closely mated profiles of the heel 12 and the annular trough 47, the radially outward rotation of toe 13 as it pivots on insertion fulcrum 46 may be limited by the contact between insertion brake 5 (which may be coincident with outer corner 4) and a wall of trough 47. In addition to other reasons, the inventors have drawn the locking segment 1 in this manner to take advantage of the enhanced retention of the gasket 30 in annular trough 47 made possible by braking rotation of the locking segment 1 on insertion. The shown configuration allows sufficient rotation to allow insertion of spigot 70 without extrusion or gouging of the surface of spigot 70. In some applications, the user may desire to provide a tighter fit, even one that causes such gouging or scraping, in order to ensure an early bite of the tooth 7 into spigot 70.

Following insertion, thrust forces and other forces tending to urge separation of the bell 40 and the spigot 70 will typically cause the spigot 70 to move in an extraction direction (e.g., along the direction of arrow 63) relative to bell 40. By virtue of the pressure exerted by bulb 32 of gasket 30, tooth 7 will be in proximity to spigot 70, if not in direct contact. In one embodiment, tooth 7 is, in the uncompressed state of gasket 30, already exposed. This exposure may be by protrusion from the surface of gasket 30, or by slight recessing beneath the surface in combination with the absence of gasket material covering the teeth. An alternative embodiment presents tooth 7 slightly recessed within gasket 30, and covered by a membrane or thin layer of compressible or puncturable material, so long as the depth and placement of tooth 7 are adapted to ensure engagement between tooth 7 and spigot 70 upon compression of gasket 30. In the shown configuration, locking segment 1 possesses a plurality of teeth 7, the tips of which are arranged in an arcuate relationship. The arcuate relationship enhances the ability of at least one tooth 7 to bite into spigot 70 despite any variations in circumference of spigot 70 or the inner dimensions of bell 40. This is because a larger annular gap (frequently due to manufacturing tolerances) will cause locking segment 1 in assembly to be rotated toward a less acute engagement angle 62 than exists in an installation having a larger spigot 70. Given the arcuate relationship of teeth 7, upon such rotation of locking segment 1 the teeth nearest the end of toe 13 rotate into contact with spigot 70. The arcuate configuration further urges at least two teeth 7 to be in contact with spigot 70, regardless of the rotation of segment 1, because a straight line can be drawn between any two adjacent teeth 7.

In response to extraction movements of the spigot 70, locking segment 1 will attempt to move in an extraction direction along with spigot 70, but axial movement of the entire body of locking segment 1 is prevented by the pressing of brake 12 against first wall 43. Locking segment 1 then rotates such that toe 13 moves radially inwardly toward spigot 70. As the locking segment 1 of the shown embodiment rotates, the slope of brake 12 allows that portion of locking segment 1 to slide upwards against the wall of annular trough 47, preventing premature binding. The rotation of locking segment 1 is caused even in the absence of a pre-existing engagement of tooth 7 with spigot 70 due to friction between the spigot 70 and the bulb 30 in which locking segment 1 is disposed. If not already in biting engagement, as such rotation continues, tooth 7 engages with spigot 70 by digging into the surface of spigot 70. Thus the further movement of spigot 70 causes a concomitant radially inward rotation of toe 13. Those in the art will understand that the relationship between the force of the axial thrust pressures on spigot 70 is by this process transferred in part into a radially inward force between the spigot 70 and the locking segment. The dynamic nature of the relationship results in increased biting, or digging of tooth 7, into spigot 70 as the pressures increase. To a point, this increasing radial pressure is advantageous, as greater radial pressure and the bite of tooth 7 exerted thereby may be necessary in response to greater axial extraction forces. It will be understood, however, that each spigot 70 will have a maximum sustainable radial pressure threshold, above which radial pressures exerted by the locking segment 1 cause or make likely a complete penetration of the spigot 70 by locking segment 1, and thus failure of the joint. As described below, the arrangement of locking segment 1 in concert with bell 40 prevents exceeding such pressures in the current invention.

The brake 12 of the locking segment 1 fits within annular trough 47 in such a manner that it has limited rotational freedom. Upon rotation of toe 13 radially inwardly, it will be understood that brake 12 also rotates. Due to the confines of annular trough 47, rotation of brake 12 is arrested by the inuring of brake 12 between the first wall 11 and the second wall 41. For the sake of clarity. Applicant notes that by the terms 'muring' and 'mures,' we mean throughout this disclosure that the segment adopts a position in which further rotation is constrained by the walls. As shown, the braking elbow 2 is forced during this muring against the first wall 43, and the forward brake 3 is forced against the second wall 41, resulting in a braked position for segment 1. It should be understood that, while forward brake 3 and braking elbow 2 are shown in the figures as terminating points on the inward side 14 and of the outward side 11 of brake 12, the invention is not so limited. Either or both forward brake 3 and brake elbow 2 can be protrusions from the respective sides, not necessarily located at the corners, so long as they are capable of muring between the first wall and the second wall in response to rotation. Additionally, given the variations in spigot and bell diameters experienced in real world applications, some configurations of brake 12 having a more rounded profile may not have a discreet pinpointable forward brake 3 or braking elbow 2, so long as rotation of brake 12 causes points to mure between the first wall and the second wall. By operation of this muring, the rotation of brake 12 is arrested; in turn, as will now be evident, the rotation of the entire locking segment 1 is arrested (except, perhaps, for deformation that may occur to the locking segment 1 or to first wall 43 or second wall 41). As the rotation of locking segment 1 cannot continue, the radial pressures exerted by toe 13 on spigot 70 will not increase, despite an increase in axial thrust pressures. Contrast is drawn to the continuing increase in radial pressure that would be expected in the absence of a rotational braking mechanism. The invention may be used to cause the plateau for this pressure line, if graphed, to occur below a pressure at which spigot 70 is deemed likely to fail.

As described, by means of the rotational braking, the radially inward pressures exerted on spigot 70 may be capped. In fact, the muring mechanism taught herein will cause a segment 1 to cease rotation at its maximum desired rotational point even in the absence of a spigot. Mathematically, despite the capping of radial pressures by muring, the forces in the system must remain net zero. In effect, the inventors believe (without wishing to be limited to theory) that the cantilever effect of the muring multiplies the axial forces applied by the locking segment 1 to the first wall 43 to offset the forces not transferred into radial pressures on the spigot 70, though it is recognized that the system is sufficiently dynamic with multiple variables that this mechanism may not always or purely be in play.

In the shown embodiment, the profile of the brake 12 is complimentary to the internal profile of the annular trough 47. Those skilled in the art will understand by reference to the claims and the preceding discussion that the profiles need not match precisely, nor even nearly, so long as the brake 12 is fitted within annular trough 47 in such a manner as to mure between first wall 43 and second wall 41 upon reaching a maximum rotation. Furthermore, those in the art will understand that while the first wall 43 and the second wall 41 are discussed herein as if they were discrete walls of the annular trough 47, the walls may be staggered or may have varying radial separations. By way of example, FIG. 1 shows first wall 43 as coincident with the inner face of bell lip 44. As further shown in this figure, braking elbow 2 actually would cantilever into a portion of the first wall 43 that is more radially inwardly extended than any existing point on second wall 41. It is possible that a bell configuration may have a radially extending wall offset from the annular trough 47. In such cases, the offset radial wall will be considered an extension of the first wall 43, even though it is offset from first wall 43 axially.

It should be noted that in the shown embodiment, the axis of rotation of the locking segment during insertion is located in or about insertion fulcrum 46, while the rotational axis occurs at a different point during extraction. More particularly, the inventors believe that the axis of rotation during extraction is a "floating" axis that is located in the brake 12 itself. This floating characteristic of the axis allows the locking segment to seek its own orientation for locking spigots and bells of varying tolerances (e.g., situations in which the annular gap 60 varies between one joint and the next). It is possible that in some installations, outer corner 4 may never contact any portion of annular trough 47. Alternatively, in tighter installations (e.g., those having a narrower annular gap 60), the outer corner 4 may contact trough terminus 42 and may even act as a cam in some respects. In normal operation, the shown embodiment does not take advantage of or exhibit any cam-type action outside of the annular trough. Further, the locking segment 1 of the current invention does not require any bell surfaces forward of the brake 12 that exert any radially inward pressures or that resist axially outward movement of the locking segment 1.

CONCLUDING REMARKS

The foregoing represents certain exemplary embodiments of the invention selected to teach the principles and practice of the invention generally to those in the art such that they may use their standard skill in the art to make these embodiments or variations based on industry skill, while remaining within the scope and practice of the invention, as well as the inventive teaching of this disclosure. The inventor stresses that the invention has numerous particular embodiments, the scope of which shall not be restricted further than the claims as allowed. Unless otherwise specifically stated, Applicant does not by consistent use of any term in the detail description in connection with an illustrative embodiment intend to limit the meaning of that term to a particular meaning more narrow than that understood for the term generally.

We claim:

1. A joint for connecting telescoped pipes comprising a bell, a spigot partially disposed within the bell, a gasket interposed between the bell and the spigot, and a locking segment disposed at least partially within said gasket, the bell having an annular trough bounded by a generally radial first wall, a generally radial second wall, and a terminus, said trough being capable of receiving at least a portion of said gasket, said looking segment being partially disposed within said annular trough and rotatable between a resting position and a braked position, wherein a portion of said locking segment disposed within said annular trough is adapted to mure between the first wall and the second wall to prevent rotation beyond the braked position, and wherein a second portion of the locking segment is disposed outside of the annular trough and is free from contact with the bell when engaged with a spigot.

2. A restraining gasket for use in sealingly connecting a spigot within a bell having an annular trough for receiving a portion of the gasket, the gasket comprising an elastomeric bulb, a retainer heal adapted to mate with the annular trough, and a locking segment comprising a brake and a toe, the toe having a tooth capable of penetrating into the spigot, the brake being disposed at least partially within said retainer heel, such that when said retainer heel is placed in the annular trough at least a portion of the brake is disposed within the annular trough, which portion possesses at least two points separated by a distance greater than the width of the annular trough, such that upon a maximum rotation a first of the at least two points resistively meets a first wall of the annular trough while a second of the at least two points resistively meets a second and opposing wall of the annular trough, such that rotation is arrested, and wherein further the bell exerts no radially inward force on the toe from any points outside of the annular trough.

3. A locking segment for use in restraining a push-on joint, said segment comprising a brake joined to a toe, the brake having a forward brake and a braking elbow on opposing sides, which forward brake and braking elbow are positioned and adapted to mure between opposing surfaces in the interior of a bell, said toe further comprising a first surface and a toothed surface adapted to engage a spigot in resistance to extractive movements of the spigot from the bell, wherein the angle between the first surface and an adjacent surffice of the heel is between approximately 120 and 170 degrees.

4. A method of controlling radial pressures, exerted between a bell and a spigot in a joint comprising the steps of a. positioning a locking segment between a bell and a spigot, b. increasing radial forces between the bell and a spigot primarily by rotating the locking segment, and c. muring a portion of the segment between two surfaces of the bell, whereby further rotation of the segment is arrested, wherein the step of increasing radial pressures primarily by rotating includes rotating the segment about an axis that is located within the segment.

5. A method of controlling radial pressures, exerted between a bell and a spigot in a joint comprising the steps of a. positioning a locking segment between a bell and a spigot, b. increasing radial forces between the bell and a spigot primarily by rotating the locking segment, and c. muring a portion of the segment between two surfaces of the bell, whereby further rotation of the segment is arrested, (i) Placing the segment within the bell, and (ii) Rotating the segment against a fulcrum on the interior of the bell by inserting the spigot into the bell, wherein further the step of increasing radial pressures primarily by rotating includes rotating the segment about a different axis than the fulcrum.

6. A method of controlling radial pressures exerted between a bell and a spigot in a joint comprising the steps of a. Placing a locking segment within the bell, and b. Rotating the locking segment about a first axis while inserting the spigot into the bell, c. increasing radial forces between the bell and a spigot by rotating the locking segment about a second axis that is displaced from the first axis, and d. muring a portion of the segment between two surfaces of the bell, whereby further rotation of the segment is arrested.

* * * * *

UNITED STATES PATENT AND TRADEMARK OFFICE
CERTIFICATE OF CORRECTION

PATENT NO. : 6,688,652 B2
APPLICATION NO. : 10/017889
DATED : February 10, 2004
INVENTOR(S) : William Holmes It is certified that error appears in the above-identified patent and that said Letters Patent is hereby corrected as shown below:

Column 9, line 43 claim 1 the term "said looking segment" is corrected to read instead --said locking segment--.

Signed and Sealed this

Third Day of June, 2008

JON W. DUDAS
*Director of the United States Patent and Trademark Office*